US011866026B2

(12) United States Patent
Moon et al.

(10) Patent No.: US 11,866,026 B2
(45) Date of Patent: Jan. 9, 2024

(54) APPARATUS FOR ELECTRICAL BRAKING WITH FAIL SAFE FUNCTION

(71) Applicants: Hyundai Motor Company, Seoul (KR); Kia Corporation, Seoul (KR)

(72) Inventors: Kwonkee Moon, Gyeonggi-do (KR); Eun Sik Kim, Gyeonggi-do (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 92 days.

(21) Appl. No.: 17/751,488

(22) Filed: May 23, 2022

(65) Prior Publication Data

US 2023/0192048 A1 Jun. 22, 2023

(30) Foreign Application Priority Data

Dec. 21, 2021 (KR) .................. 10-2021-0183584

(51) Int. Cl.
*B60T 8/92* (2006.01)
*B60T 17/22* (2006.01)
*B60L 7/24* (2006.01)

(52) U.S. Cl.
CPC ...... *B60T 8/92* (2013.01); *B60L 7/24* (2013.01); *B60T 17/22* (2013.01);
(Continued)

(58) Field of Classification Search
CPC ........ B60T 8/92; B60T 17/22; B60T 2270/40; B60T 2270/402; B60T 2270/406;
(Continued)

(56) References Cited

U.S. PATENT DOCUMENTS 6,345,225 B1 * 2/2002 Bohm ................ B60T 8/885
701/72
10,293,798 B2  5/2019 Johnson et al.
(Continued)

FOREIGN PATENT DOCUMENTS

CN  110654364 A  1/2020
CN  110861625 A  3/2020
(Continued)

OTHER PUBLICATIONS (https://m.blog.naver.com/PostView.naver?isHttpsRedirect=true&blogId=autolog&logNo=10168450876) and its English machine translation, May 16, 2013.

*Primary Examiner* — Jacob M Amick
(74) *Attorney, Agent, or Firm* — Fox Rothschild LLP

(57) ABSTRACT

An apparatus configured to perform electrical braking with a fail-safe function includes a main brake pedal sensor configured to generate a first output signal, a main brake controller configured to brake a vehicle by controlling a brake according to a first braking signal based on the first output signal, a redundancy brake pedal sensor configured to generate a second output signal proportional to the stroke of the brake pedal, the second output signal having a magnitude within a preset error range from the first output signal, and a redundancy brake controller configured to brake the vehicle by controlling the brake according to the second braking signal based on the second output signal, in which the redundancy brake controller may be configured to brake the vehicle when the main brake controller fails, and the main brake controller may be configured to brake the vehicle when the redundancy brake controller fails.

16 Claims, 6 Drawing Sheets

(52) U.S. Cl.
CPC ... *B60T 2270/402* (2013.01); *B60T 2270/404* (2013.01); *B60T 2270/406* (2013.01); *B60T 2270/413* (2013.01); *B60T 2270/60* (2013.01)

(58) Field of Classification Search
CPC ......... B60T 2270/408; B60T 2270/413; B60T 2270/60; B60T 8/88; B60T 8/885; B60L 7/24

See application file for complete search history.

(56) References Cited

U.S. PATENT DOCUMENTS

| | | |
|---|---|---|
| 2013/0282249 A1 | 10/2013 | Heise et al. |
| 2017/0240147 A1 | 8/2017 | Kotera et al. |
| 2019/0232902 A1 | 8/2019 | Teng |
| 2020/0094801 A1 | 3/2020 | Huff et al. |
| 2020/0201323 A1 | 6/2020 | Park |
| 2022/0340118 A1* | 10/2022 | Meyer ................... B60T 13/741 |

FOREIGN PATENT DOCUMENTS

| | | |
|---|---|---|
| JP | 2019-038286 A | 3/2019 |
| JP | 6565388 B2 | 8/2019 |
| JP | 6729253 B2 | 7/2020 |
| KR | 101889994 B1 | 8/2018 |
| KR | 2020-0081530 A | 7/2020 |
| KR | 2021-0061643 A | 5/2021 |

\* cited by examiner

| | MBPS | RBPS | MBC | RBC | EPBC | CONTROL STRATEGY |
|---|---|---|---|---|---|---|
| ALL NORMAL | O | O | O | O | O | MBC RECEIVES MBPS SIGNAL AND CONTROLS BRAKING |
| BRAKE PEDAL SENSOR FAILURE | X | O | O/X | O | O/X | RBC RECEIVES RBPS SIGNAL AND CONTROLS BRAKING |
| | O | X | O | O/X | O/X | MBC RECEIVES MBPS SIGNAL AND CONTROLS BRAKING |
| | X | X | O/X | O/X | O | EPBS BRAKIG CONTROL |
| | ? (DIFFERENCE IN MBPS OUTPUT) | ? (DIFFERENCE IN MBPS OUTPUT/RBPS OUTPUT) | O | O/X | O/X | MBC RECEIVES MBPS SIGNAL AND CONTROLS BRAKING |
| MBC FAILURE | O/X | O | X | O | O/X | RBC RECEIVES RBPS SIGNAL AND CONTROLS BRAKING |
| RBC FAILURE | O | O/X | O | X | O/X | MBC RECEIVES MBPS SIGNAL AND CONTROLS BRAKING |
| MBPS AND MBC FAILURE | X | O | X | O | O/X | RBC RECEIVES RBPS SIGNAL AND CONTROLS BRAKING |
| MBPS AND RBC FAILURE | X | O/X | O/X | X | O | EPBS BRAKIG CONTROL |
| RBPS AND RBC FAILURE | O | X | O | X | O/X | MBC RECEIVES MBPS SIGNAL AND CONTROLS BRAKING |
| RBPS AND MBC FAILURE | O/X | X | X | O/X | O | EPBS BRAKIG CONTROL |
| MBC AND RBC FAILURE | O/X | O/X | X | X | O | EPBS BRAKIG CONTROL |
| MBC, RBC AND EPBC FAILURE | O/X | O/X | X | X | X | REGENERATIVE BRAKE CONTROLLER CONTROLS BRAKING |

FIG. 3

| | MBPS | RBPS | MBC | RBC | EPBC | CONTROL STRATEGY |
|---|---|---|---|---|---|---|
| ALL NORMAL | O | O | O | O | O | MBC RECEIVES MBPS SIGNAL AND CONTROLS BRAKING — 501 |
| BRAKE PEDAL SENSOR FAILURE | X | O | O | O/X | O/X | MBC RECEIVES RBPS SIGNAL AND CONTROLS BRAKING |
| | O | X | O | O/X | O/X | MBC RECEIVES MBPS SIGNAL AND CONTROLS BRAKING |
| | X | X | O/X | O/X | O | EPBS BRAKING CONTROL |
| | ? (DIFFERENCE IN MBPS OUTPUT/RBPS OUTPUT) | ? (DIFFERENCE IN MBPS OUTPUT/RBPS OUTPUT) | O | O/X | O/X | MBC RECEIVES MBPS SIGNAL AND CONTROLS BRAKING |
| MBC FAILURE | O/X | O | X | O | O/X | RBC RECEIVES RBPS SIGNAL AND CONTROLS BRAKING |
| RBC FAILURE | O | O/X | O | X | O/X | MBC RECEIVES MBPS SIGNAL AND CONTROLS BRAKING |
| MBPS AND MBC FAILURE | X | O | X | O | O/X | RBC RECEIVES RBPS SIGNAL AND CONTROLS BRAKING — 502 |
| MBPS AND RBC FAILURE | X | O | O | X | O/X | MBC RECEIVES MBPS SIGNAL AND CONTROLS BRAKING |
| RBPS AND RBC FAILURE | O | X | O | X | O/X | MBC RECEIVES MBPS SIGNAL AND CONTROLS BRAKING — 503 |
| RBPS AND MBC FAILURE | O | X | X | O | O/X | RBC RECEIVES MBPS SIGNAL AND CONTROLS BRAKING |
| MBC AND RBC FAILURE | O/X | O/X | X | X | O | EPBS BRAKING CONTROL |
| MBC, RBC AND EPBC FAILURE | O/X | O/X | X | X | X | REGENERATIVE BRAKE CONTROLLER CONTROLS BRAKING |

FIG. 5

APPARATUS FOR ELECTRICAL BRAKING WITH FAIL SAFE FUNCTION

CROSS-REFERENCE TO RELATED APPLICATION(S)

This application claims, under 35 U.S.C. § 119(a), the benefit of Korean Patent Application No. 10-2021-0183584, filed on Dec. 21, 2021 in the Korean Intellectual Property Office, the disclosure of which is incorporated herein by reference in its entirety.

BACKGROUND

Technical Field

Embodiments of the present disclosure relate to an apparatus for electrical braking with a fail-safe function and a method thereof.

Background

Brake-By-Wire (BBW) is a technology that detects a brake pedal operation with a sensor and controls a controller to generate optimal braking force for each wheel. By replacing complicated hydraulic or pneumatic braking systems from a driver's seat to all wheels of a vehicle with a simple wire, a BBW system may be advantageous in terms of design and weight reductions and may greatly improve fuel efficiency. Thus, the application potential thereof is highly anticipated.

BBWs may include a controller, such as a processor, or electronic components, such as a brake pedal sensor. Therefore, a fail-safe function capable of safely braking, even when some of these components fail, is required. In particular, in the case of electric vehicles, braking using regenerative braking of a drive motor is possible, and, with additional functions such as Electronic Stability Control (ESC), many braking-related technologies, such as an Electronic Parking Brake (EPB), have been developed. As a result, there is a need to implement an efficient fail-safe function in connection with regenerative braking and EPB.

SUMMARY

Embodiments of the present disclosure may provide an apparatus for electrical braking with a fail-safe function capable of implementing a fail-safe function of a Brake-By-Wire (BBW), and efficiently braking a vehicle in connection with an existing system.

According to an embodiment of the present disclosure, an apparatus for electrical braking with a fail-safe function may include a main brake pedal sensor configured to generate a first output signal proportional to a stroke of a brake pedal, a main brake controller configured to brake a vehicle by controlling a brake according to a first braking signal based on the first output signal generated by the main brake pedal sensor, a redundancy brake pedal sensor configured to generate a second output signal proportional to the stroke of the brake pedal, the second output signal having a magnitude within a preset error range from the first output signal, and a redundancy brake controller configured to brake the vehicle by controlling the brake according to a second braking signal based on the second output signal generated by the redundancy brake pedal sensor, in which the redundancy brake controller may be configured to brake the vehicle when the main brake controller fails, and the main brake controller may be configured to brake the vehicle when the redundancy brake controller fails.

According to another embodiment of the present disclosure, an apparatus for electrical braking with a fail-safe function may include a main brake pedal sensor configured to generate a first output signal proportional to a stroke of a brake pedal, a redundancy brake pedal sensor configured to generate a second output signal proportional to the stroke of the brake pedal, the second output signal having a magnitude within a preset error range from the first output signal, a main brake controller configured to brake a vehicle by controlling a brake according to a second braking signal based on the first output signal generated by the main brake pedal sensor or the second output signal generated by the redundancy brake pedal sensor, and a redundancy brake controller configured to brake the vehicle by controlling the brake according to a second braking signal based on the second output signal generated by the redundancy brake pedal sensor or the first output signal generated by the main brake pedal sensor, in which the redundancy brake controller may be configured to brake the vehicle when the main brake controller fails, and the main brake controller may be configured to brake the vehicle when the redundancy brake controller fails.

BRIEF DESCRIPTION OF DRAWINGS

The above and other aspects, features, and advantages of the present disclosure will be more clearly understood from the following detailed description taken in conjunction with the accompanying drawings, in which:

FIG. 3 is a diagram illustrating a control table for each failure mode applicable to the exemplary embodiment of FIG. 1;

FIG. 5 is a diagram illustrating a control table for each failure mode applicable to the exemplary embodiment of FIG. 4.

DETAILED DESCRIPTION

Figure 1:
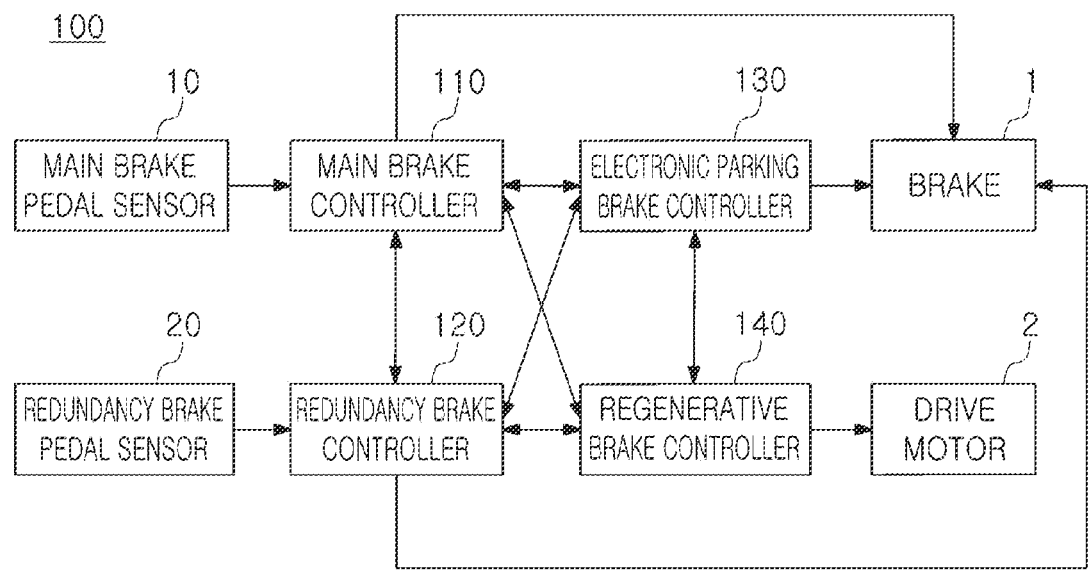
FIG. 1 is a configuration diagram of an apparatus for electrical braking with a fail-safe function according to an exemplary embodiment in the present disclosure.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The terminology used herein is for the purpose of describing particular embodiments only and is not intended to be limiting of the disclosure. As used herein, the singular forms "a," "an" and "the" are intended to include the plural forms as well, unless the context clearly indicates otherwise. These terms are merely intended to distinguish one component from another component, and the terms do not limit the nature, sequence or order of the constituent components. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Throughout the specification, unless explicitly described to the contrary, the word "comprise" and variations such as "comprises" or "comprising" will be understood to imply the inclusion of stated elements but not the exclusion of any other elements. In addition, the terms "unit", "-er", "-or", and "module" described in the specification mean units for processing at least one function and operation, and can be implemented by hardware components or software components and combinations thereof.

Further, the control logic of the present disclosure may be embodied as non-transitory computer readable media on a computer readable medium containing executable program instructions executed by a processor, controller or the like. Examples of computer readable media include, but are not limited to, ROM, RAM, compact disc (CD)-ROMs, magnetic tapes, floppy disks, flash drives, smart cards and optical data storage devices. The computer readable medium can also be distributed in network coupled computer systems so that the computer readable media is stored and executed in a distributed fashion, e.g., by a telematics server or a Controller Area Network (CAN).

Hereinafter, exemplary embodiments in the present disclosure will be described in detail with reference to the accompanying drawings. Exemplary embodiments in the present disclosure may be modified into several other forms and the scope of the present disclosure is not limited to exemplary embodiments to be described below. In the drawings, shapes and dimensions of elements may be exaggerated for clarity, and the same components are denoted by the same reference numerals.

Furthermore, unless otherwise defined, all terms used herein, including technical or scientific terms, have the same meanings as those generally understood by those skilled in the art to which the present disclosure pertains. Such terms as those defined in a generally used dictionary are to be interpreted as having meanings equal to the contextual meanings in the relevant field of art, and are not to be interpreted as having ideal or excessively formal meanings unless clearly defined as having such in the present application.

FIG. 1 is a configuration diagram of an apparatus 100 configured to perform electrical braking with a fail-safe function according to an exemplary embodiment in the present disclosure. FIGS. 2A-2D are internal block diagrams of each controller according to an exemplary embodiment in the present disclosure. FIG. 3 is a diagram illustrating a control table for each failure mode applicable to the exemplary embodiment of FIG. 1.

Hereinafter, the configuration and operation of the apparatus 100 configured to perform electrical braking with a fail-safe function will be described in detail with reference to FIGS. 1-3.

First, as illustrated in FIG. 1, the apparatus 100 configured to perform electrical braking with a fail-safe function may include a main brake pedal sensor 10, a redundancy brake pedal sensor 20, a main brake controller 110 as well as a redundancy brake controller 120, an electronic parking brake controller 130, and a regenerative brake controller 140.

That is, as illustrated in FIG. 1, the main brake pedal sensor 10 may be connected to the main brake controller 110, and the redundancy brake pedal sensor 20 may be connected to the redundancy brake controller 120. In addition, the main brake controller 110, the redundancy brake controller 120, the electronic parking brake controller 130, and the regenerative brake controller 140 may be configured to be interconnected.

Figure 2A:
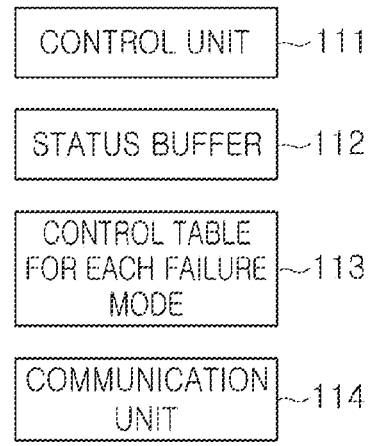
FIGS. 2A to 2D are internal block diagrams of each controller according to an exemplary embodiment in the present disclosure.
Figure 2B:
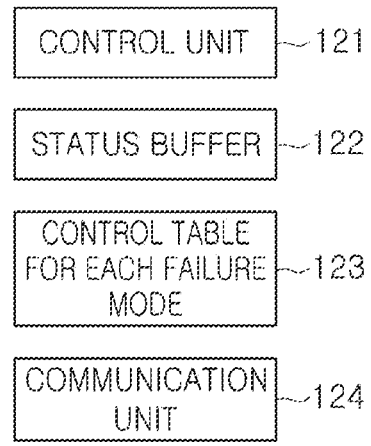
Figure 2C:
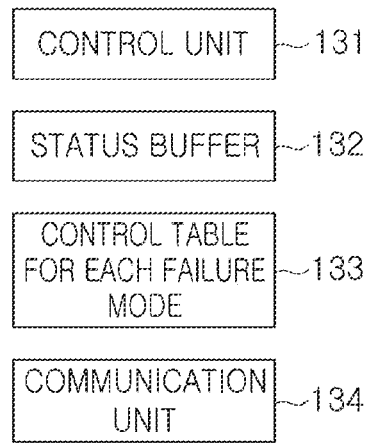
Figure 2D:
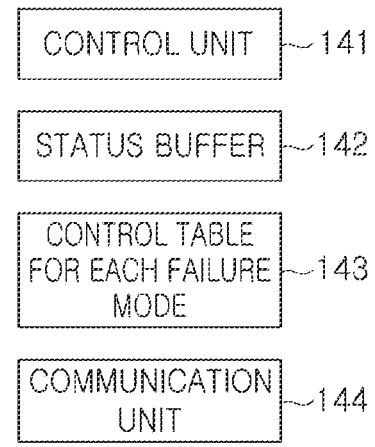

Meanwhile, as illustrated in FIG. 2A, the main brake controller 110 may include a control unit 111, a status buffer 112, a control table 113 for each failure mode, and a communication unit 114. As illustrated in FIG. 2B, the redundancy brake controller 120 may include a control unit 121, a status buffer 122, a control table 123 for each failure mode, and a communication unit 124. As illustrated in FIG. 2C, the electronic parking brake controller 130 may include a control unit 131, a status buffer 132, a control table 133 for each failure mode, and a communication unit 134. As illustrated in FIG. 2D, the regenerative brake controller 140 may include a control unit 141, a status buffer 142, a control table 143 for each failure mode, and a communication unit 144.

Specifically, the main brake pedal sensor 10 may be configured to generate a first output signal (e.g., a voltage form) proportional to a stroke of a brake pedal, that is, a distance the brake pedal moves when the brake pedal is depressed.

The control unit 111 of the main brake controller 110 may be configured to generate a first braking signal (e.g., a braking torque command value) based on the first output signal generated by the main brake pedal sensor 10, and may be configured to brake a vehicle by controlling a brake 1 according to the generated first braking signal.

Meanwhile, similar to the main brake pedal sensor 10, the redundancy brake pedal sensor 20 may be configured to generate a second output signal (e.g., a voltage form) proportional to the stroke of the brake pedal, that is, the distance the brake pedal moves when the brake pedal is depressed. Here, the redundancy brake pedal sensor 20 may be the same type of sensor having the same specifications as the main brake pedal sensor 10. Therefore, the second output signal generated by the redundancy brake pedal sensor 20 may have a magnitude within a preset error range from the first output signal generated by the main brake pedal sensor 10.

The control unit 121 of the redundancy brake controller 120 may be configured to generate a second braking signal (e.g., a braking torque command value) based on the second output signal generated by the redundancy brake pedal sensor 20, and may be configured to brake a vehicle by controlling the brake 1 according to the generated second braking signal.

According to an exemplary embodiment in the present disclosure, the apparatus 100 for electrical braking with a fail-safe function may include two brake pedal sensors 10 and 20, and two brake controllers 110 and 120 controlling the brake 1 by receiving signals output from the two brake pedal sensors 10 and 20, in which, when the main brake controller 110 fails, the redundancy brake controller 120 may be configured to control the brake 1 to brake a vehicle.

On the other hand, when the redundancy brake controller 120 fails, the main brake controller 110 may be configured to control the brake 1 to brake a vehicle.

According to the exemplary embodiment of FIG. 1, since the main brake controller 110 receives only the signal output from the main brake pedal sensor 10, when one of the main brake pedal sensor 10 or the main brake controller 110 fails, the other may be considered a failure.

Similarly, according to the exemplary embodiment of FIG. 1, since the redundancy brake controller 120 receives only the signal output from the redundancy brake pedal sensor 20, when one of the redundancy brake pedal sensor 20 or the redundancy brake controller 120 fails, the other may be considered as failure.

As described above, according to an exemplary embodiment in the present disclosure, the apparatus 100 configured to perform electrical braking with a fail-safe function may include the two brake pedal sensors 10 and 20, and the two brake controllers 110 and 120 may be configured to control the brake 1 by receiving the signals output from the brake pedal sensors 10 and 20, respectively. By controlling the brake 1 through the other controller when any one of the two controllers fails, it is possible to implement the fail-safe function.

Meanwhile, when the main brake controller 110 and the redundancy brake controller 120 fail, the control unit 131 of the electronic parking brake controller 130 may be configured to brake a vehicle by controlling the brake 1 according to a preset parking braking signal (e.g., a braking torque command value).

The above-described electronic parking brake controller 130 may be a controller constituting an Electronic Parking Brake (EPB) system that maintains a parking state of a vehicle by controlling the brake 1 with a preset braking torque during parking.

According to an exemplary embodiment in the present disclosure, braking using the Electronic Parking Brake (EPB) may have better responsiveness and faster braking than braking by regenerative braking, so the electronic parking brake controller 130 may be configured to be operated before the regenerative brake controller 140 is operated.

When the main brake controller 110, the redundancy brake controller 120, and the electronic parking brake controller 130 fail, the control unit 141 of the regenerative brake controller 140 may be configured to control the drive motor 2 according to a regenerative braking torque having a preset magnitude to brake the vehicle.

Meanwhile, the brake 1 may be configured to generate a braking torque according to any one of the first braking signal generated by the main brake controller 110, the second braking signal generated by the redundancy brake controller 120, and the parking braking signal generated by the electronic parking brake controller 130, and may be configured to brake a vehicle according to the generated braking torque.

The above-described brake 1 may be a Brake-By-Wire (BBW) including at least one of an Electro-Hydraulic Brake (EHB), an Electro-Mechanical Brake (EMB), and/or a hybrid EMB.

The drive motor 2 is a driving source of an eco-friendly vehicle such as an electric vehicle, and may brake the vehicle by being driven according to the regenerative braking torque generated by the regenerative brake controller 140. The drive motor 2 may include various types of motors, such as an induction motor and a brushless DC motor.

Meanwhile, the above-described main brake controller 110, redundancy brake controller 120, electronic parking brake controller 130, and regenerative brake controller 140 may include status buffers 112, 122, 132, and 142, respectively, configured to store failure states of the main brake pedal sensor 10, the redundancy brake pedal sensor 20, the main brake controller 110, the redundancy brake controller 120, and the electronic parking brake controller 130, respectively.

In the present disclosure, since the regenerative brake controller 140 is configured to be operated when all of the above controllers are in a failure state, a separate failure state is not assumed, but it should be noted that the failure state may be further stored according to the needs of a person skilled in the art.

The status buffers 112, 122, 132, and 142 may be provided to determine which of the main brake controller 110, the redundancy brake controller 120, the electronic parking brake controller 130, and the regenerative brake controller 140 will brake a vehicle when the brake pedal is depressed.

The failure states of the main brake pedal sensor 10, the redundancy brake pedal sensor 20, the main brake controller 110, the redundancy brake controller 120, and the electronic parking brake controller 130 stored in the status buffers 112, 122, 132, and 142, respectively, may be configured to be performed in any controller. That is, as illustrated in FIG. 1, the main brake controller 110, the redundancy brake controller 120, the electronic parking brake controller 130, and the regenerative brake controller 140 may be configured to enable wired/wireless communication with other controllers through each of the communication units 114, 124, 134, and 144, and may be configured to share failure states of adjacent controllers, which are determined by the controllers 110, 120, 130, and 140, with other controllers. Accordingly, for example, the main brake controller 110 may be configured to determine the failure states of the main brake pedal sensor 10 and the redundancy brake controller 120, the failure state of the redundancy brake pedal sensor 20 shared through the redundancy brake controller 120, and the failure state of the electronic parking brake controller 130, and configured to share the failure states with other controllers 120 to 140.

Meanwhile, the failures of the main brake pedal sensor 10, the redundancy brake pedal sensor 20, the main brake controller 110, the redundancy brake controller 120, and the electronic parking brake controller 130 may be determined as follows.

For example, in a case in which power supplied to the main brake pedal sensor 10, the redundancy brake pedal sensor 20, the main brake controller 110, the redundancy brake controller 120, and the electronic parking brake controller 130 during initial startup is abnormal (e.g., sudden voltage drop), it may be determined as a failure. There may be various cases in which power is abnormal such as, for example, cases in which there is a sudden voltage drop below a voltage of a preset magnitude, etc.

Alternatively, as the signals output from the main brake pedal sensor 10 and the redundancy brake pedal sensor 20 during the initial startup are abnormal, or a preset test signal (e.g., a certain magnitude of voltage signal) is applied during the initial startup, a case may arise in which the signals output from the main brake controller 110, the redundancy brake controller 120, and the electronic parking brake controller 130 are abnormal and it may be determined as a failure. There may be the case in which the signal is abnormal such as, for example, the case in which there is excessive noise in the signal, the case in which the signal is not continuous, the case in which the magnitude of the signal is greater than a preset value, etc.

Thereafter, one of the main brake controller 110, the redundancy brake controller 120, the electronic parking brake controller 130, and the regenerative brake controller 140 may be configured to brake a vehicle according to the control tables 113, 123, 133, and 143 for each failure mode and the failure states stored in the status buffers 112, 122, 132, and 142.

The above-described control table for each failure mode may be a table which stores which one of the main brake controller 110, the redundancy brake controller 120, the electronic parking brake controller 130, and the regenerative brake controller 140 will be configured to brake a vehicle according to a combination of the failure state of the main brake pedal sensor 10, the failure state of the redundancy brake pedal sensor 20, and the failure states of the main brake controller 110, the redundancy brake controller 120, and the electronic parking brake controller 130, which is stored in advance.

FIG. 3 exemplarily illustrates a control table for each failure mode applicable to the exemplary embodiment of FIG. 1.

In FIG. 3, a Main Brake Pedal Sensor (MPBS) may refer to the main brake pedal sensor 10, a Redundancy Brake pedal Sensor (RBPS) may refer to the redundancy brake pedal sensor 20, a Main Brake Controller (MBC) may refer to the main brake controller 110, a Redundancy Brake Controller (RBC) may refer to the redundancy brake controller 120, and an Electronic Parking Brake Controller (EPBC) may refer to the electronic parking brake controller 130. In addition, O may mean a normal state, X may mean a failure state, and O/X may mean that it does not matter what state it is (do not care).

Referring to FIG. 3, a first case of the failure of the brake pedal sensor is exemplary described in which, when the Main Brake Pedal Sensor (MPBS) fails, and the Redundancy Brake Pedal Sensor (RBPS) and the Redundancy Brake Controller (RBC) are normal, the Redundancy Brake Controller (RBC) may receive a signal output from the Redundancy Brake Pedal Sensor (RBPS) to control the braking.

In addition, as illustrated in FIG. 3, in a fourth case of the failure of the brake pedal sensor is provided in which, when the output of the Main Brake Pedal Sensor (MPBS) and the output of the Redundancy Brake Pedal Sensor (RBPS) are normal but have different values, if the Main Brake Controller (MBC) is normal, the Main Brake Controller (MBC) may receive a signal output from the Main Brake Pedal Sensor (MBPS) to control the braking.

Figure 4:
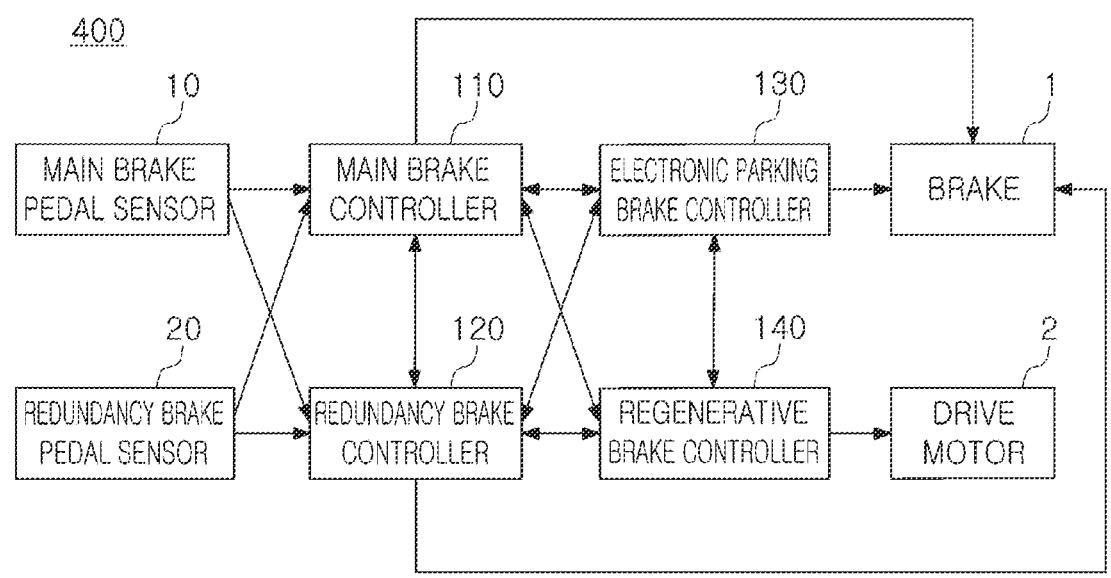
FIG. 4 is a configuration diagram of an apparatus for electrical braking with a fail-safe function according to an exemplary embodiment in the present disclosure.

Meanwhile, FIG. 4 is a configuration diagram of an apparatus 400 configured to perform electrical braking with a fail-safe function according to an exemplary embodiment in the present disclosure, and FIG. 5 illustrates a control table for each failure mode applicable to the exemplary embodiment of FIG. 4.

Unlike FIG. 1, in FIG. 4, the main brake pedal sensor 10 may be connected to both the main brake controller 110 and the redundancy brake pedal sensor 20, and the redundancy brake pedal sensor 20 may also be connected both the main brake controller 110 and the redundancy brake pedal sensor 20.

Accordingly, the main brake controller 110 may be configured to control the brake 1 according to the second braking signal based on the first output signal generated by the main brake pedal sensor 10 or the second output signal generated by the redundancy brake pedal sensor 20 to brake a vehicle.

Similarly, the redundancy brake controller 120 may be configured to control the brake 1 according to the second braking signal based on the first output signal generated by the main brake pedal sensor 10 or the second output signal generated by the redundancy brake pedal sensor 20 to brake a vehicle.

FIG. 5 is substantially the same as in FIG. 3 except for reference numerals 501 to 503, illustrated in FIG. 5.

That is, in the case of reference numeral 501, when the Main Brake Pedal Sensor (MBPS) fails and the redundancy brake pedal sensor 20 and the Main Brake Controller (MBC) are normal, the Main Brake Controller (MBC) may be configured to receive the signal output from the Redundancy Brake Pedal Sensor (RBPS) to control the braking. In this case, referring to FIG. 3, the Redundancy Brake Controller (RBC) may be configured to receive the signal output from the Redundancy Brake Pedal Sensor (RBPS) to control the braking.

In addition, in the case of reference numeral 502, when the Main Brake Pedal Sensor (MBPS) and the Redundancy Brake Controller (RBC) fail, and the Redundancy Brake Pedal Sensor (RBPS) and the Main Brake Controller (MBC) are normal, the Main Brake Controller (MBC) may receive the signal output from the Redundancy Brake Pedal Sensor (RBPS) to control the braking. In this case, according to FIG. 3, the Electronic Parking Brake Controller (EPBC) controls the braking.

In addition, in the case of reference numeral 503, when the redundancy brake pedal sensor 20 and the Main Brake Controller (MBC) fail, and the Main Brake Pedal Sensor (MBPS) and the Redundancy Brake Controller (RBC) are normal, the Redundancy Brake Controller (RBC) may receive the signal output from the Main Brake Pedal Sensor (MBPS) to control the braking. In this case, according to FIG. 3, the Electronic Parking Brake Controller (EPBC) controls the braking.

Except for the above-described differences, the operations of FIGS. 1 and 3 are the same, and therefore, a repetitive description will be omitted.

As described above, according to an exemplary embodiment in the present disclosure, it is possible to implement the fail-safe function of the Brake-By-Wire (BBW) by detecting the brake pedal operation through the redundancy brake pedal sensor in addition to the existing main brake pedal sensor, and braking a vehicle with the redundancy brake controller when the main brake controller fails.

In addition, according to an exemplary embodiment in the present disclosure, when the main brake controller and the redundancy brake controller fail, the electronic parking brake controller is configured to control the brake, or efficiently brake a vehicle in connection with the existing system by controlling the drive motor using the regenerative brake controller when the main brake controller, the redundancy brake controller, and the electronic parking brake controller fail.

Figure 6:
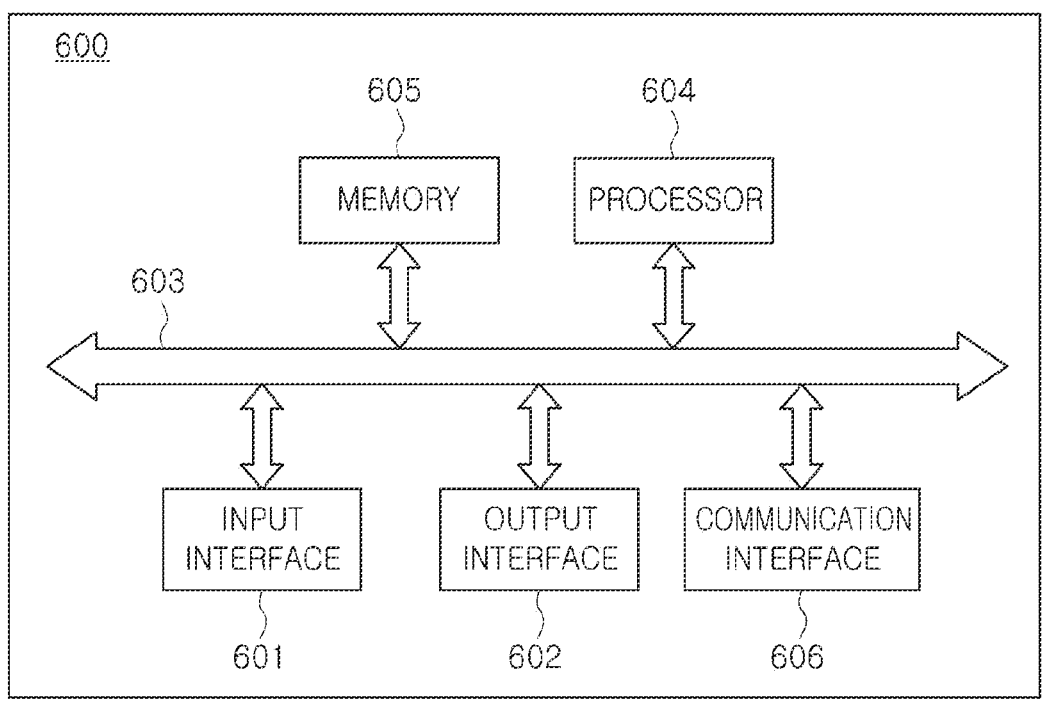
FIG. 6 is a block diagram of a computer device that may fully or partially implement each controller of an apparatus for electrical braking with a fail-safe function according to an exemplary embodiment in the present disclosure.

Meanwhile, FIG. 6 is a block diagram of a computer device that may fully or partially implement each controller of the apparatus configured to perform electrical braking with a fail-safe function according to an exemplary embodiment in the present disclosure, and the computer device may be applied to each of the controllers 110 to 140 of the apparatus for electrical braking with a fail-safe function illustrated in FIG. 1.

As illustrated in FIG. 6, a computer device 600 may include an input interface 601, an output interface 602, a processor 604, a memory 605, and a communication interface 606, and the input interface 601, the output interface 602, the processor 604, the memory 605, and the communication interface 606 may be interconnected via a system bus 603.

In an exemplary embodiment in the present disclosure, the memory 605 may be configured to be used to store programs, instructions, or codes, and the processor 604 may be configured to execute the programs, instructions, or codes stored in the memory 605, and control the input interface 601 may be configured to receive a signal and control the output interface 602 to transmit the signal. The above-described memory 605 may include read-only memory and random access memory, and be configured to provide instructions and data to the processor 604.

In an exemplary embodiment in the present disclosure, the processor 604 may be a central processing unit (CPU), and it should be understood that the processor 604 may include other general-purpose processors, a digital signal processor (DSP), an application specific integrated circuit (ASIC), a field programmable gate array (FPGA) or other programmable logic devices, individual gates or transistor logic devices, individual hardware components, etc. The general-purpose processor may be a microprocessor, or the processor may be any conventional processor, etc. The above-described processor 604 may be configured to perform an operation of each controller of the above-described electronic braking device.

In one implementation process, the method of FIG. 3 may be achieved by an integrated logic circuit of hardware in the processor 604 or instructions in the form of software. The contents of the method disclosed in relation to the exemplary embodiments of the present disclosure may be implemented to be performed and completed by a hardware processor, or performed and completed by a combination of hardware and software modules of the processor. The software module may be disposed in a storage medium such as random access memory, flash memory, read-only memory, programmable read-only memory or electrically erasable programmable memory, a register, etc. The storage medium may be located in the memory 605, and the processor 604 may be configured to read information from the memory 605, and implement the contents of the above-described method in combination with hardware. In order to avoid duplication, detailed descriptions will be omitted herein.

According to an exemplary embodiment in the present disclosure, it is possible to implement a fail-safe function of a brake-by-wire by detecting a brake pedal operation through a redundancy brake pedal sensor in addition to the existing main brake pedal sensor, and braking a vehicle with the redundancy brake controller when the main brake controller fails.

In addition, according to an exemplary embodiment in the present disclosure, when the main brake controller and the redundancy brake controller fail, the electronic parking brake controller may be configured to control the brake, or efficiently brake a vehicle in connection with the existing system by controlling a drive motor using a regenerative brake controller when the main brake controller, the redundancy brake controller, and the electronic parking brake controller fail.

Although the present disclosure has been described with reference to exemplary embodiments and the accompanying drawings, the present disclosure is not limited thereto, but may be variously modified and altered by those skilled in the art to which the present disclosure pertains without departing from the spirit and scope of the present disclosure claimed in the following claims.

Therefore, embodiments of the present invention are not intended to limit the technical spirit of the present invention, but provided only for the illustrative purpose. The scope of the present disclosure should be construed on the basis of the accompanying claims, and all the technical ideas within the scope equivalent to the claims should be included in the scope of the present disclosure.

What is claimed is:

1. An apparatus for performing electrical braking with a fail-safe function, comprising:
   a main brake pedal sensor configured to generate a first output signal proportional to a stroke of a brake pedal;
   a main brake controller configured to brake a vehicle by controlling a brake according to a first braking signal based on the first output signal generated by the main brake pedal sensor;
   a redundancy brake pedal sensor configured to generate a second output signal proportional to the stroke of the brake pedal, the second output signal having a magnitude within a preset error range from the first output signal; and
   a redundancy brake controller configured to brake the vehicle by controlling the brake according to a second braking signal based on the second output signal generated by the redundancy brake pedal sensor,
   wherein:
      the redundancy brake controller is configured to brake the vehicle when the main brake controller fails, and the main brake controller is configured to brake the vehicle when the redundancy brake controller fails.

2. The apparatus of claim 1, further comprising an electronic parking brake controller configured to brake the vehicle by controlling the brake according to a preset parking braking signal when the main brake controller and the redundancy brake controller fail.

3. The apparatus of claim 2, further comprising a regenerative brake controller configured to brake the vehicle by controlling a drive motor according to a regenerative braking torque having a preset magnitude when the main brake controller, the redundancy brake controller, and the electronic parking brake controller fail.

4. The apparatus of claim 3, wherein:
   the main brake controller, the redundancy brake controller, the electronic parking brake controller, and the regenerative brake controller include a status buffer configured to store failure states of the main brake pedal sensor, the redundancy brake pedal sensor, the main brake controller, the redundancy brake controller, and the electronic parking brake controller, respectively, and
   one of the main brake controller, the redundancy brake controller, the electronic parking brake controller, and the regenerative brake controller is configured to brake the vehicle according to a control table for each failure mode and the failure states stored in the status buffer.

5. The apparatus of claim 4, wherein the control table for each failure mode is a table which is configured to store which of the main brake controller, the redundancy brake controller, the electronic parking brake controller, and the regenerative brake controller are configured to brake the vehicle according to a combination of the failure state of the main brake controller, the failure state of the redundancy brake controller, and the failure states of the main brake controller, the redundancy brake controller, and the electronic parking brake controller.

6. The apparatus of claim 2, wherein the main brake pedal sensor, the redundancy brake pedal sensor, the main brake controller, the redundancy brake controller, and the electronic parking brake controller are in a failure state when:
    power supplied to each of the main brake pedal sensor, the redundancy brake pedal sensor, the main brake controller, the redundancy brake controller, and the electronic parking brake controller is abnormal:
    signals output from the main brake pedal sensor and the redundancy brake pedal sensor during an initial startup are abnormal; and
    signals output from the main brake controller, the redundancy brake controller, and the electronic parking brake controller are abnormal as a preset test signal is applied during the initial startup.

7. The apparatus of claim 1, wherein, when the first output signal and the second output signal have different values, the main brake controller is configured to control the brake according to a first braking signal based on the first output signal to brake the vehicle.

8. The apparatus of claim 1, wherein the brake is a Brake-By-Wire (BBW) and includes at least one of an Electro-Hydraulic Brake (EHB), an Electro-Mechanical Brake (EMB), and a hybrid EMB.

9. An apparatus for performing electrical braking with a fail-safe function, comprising:
    a main brake pedal sensor configured to generate a first output signal proportional to a stroke of a brake pedal;
    a redundancy brake pedal sensor configured to generate a second output signal proportional to the stroke of the brake pedal, the second output signal having a magnitude within a preset error range from the first output signal;
    a main brake controller configured to brake a vehicle by controlling a brake according to a second braking signal based on the first output signal generated by the main brake pedal sensor or the second output signal generated by the redundancy brake pedal sensor; and
    a redundancy brake controller configured to brake the vehicle by controlling the brake according to a second braking signal based on the second output signal generated by the redundancy brake pedal sensor or the first output signal generated by the main brake pedal sensor, wherein:
        the redundancy brake controller is configured to brake the vehicle when the main brake controller fails, and the main brake controller is configured to brake the vehicle when the redundancy brake controller fails.

10. The apparatus of claim 9, further comprising an electronic parking brake controller configured to brake the vehicle by controlling the brake according to a preset parking braking signal when the main brake controller and the redundancy brake controller fail.

11. The apparatus of claim 10, further comprising a regenerative brake controller configured to brake the vehicle by controlling a drive motor according to a regenerative braking torque having a preset magnitude when the main brake controller, the redundancy brake controller, and the electronic parking brake controller fail.

12. The apparatus of claim 11, wherein:
    the main brake controller, the redundancy brake controller, the electronic parking brake controller, and the regenerative brake controller include a status buffer configured to store failure states of the main brake pedal sensor, the redundancy brake pedal sensor, the main brake controller, the redundancy brake controller, and the electronic parking brake controller, respectively, and
    one of the main brake controller, the redundancy brake controller, the electronic parking brake controller, and the regenerative brake controller are configured to brake the vehicle according to a control table for each failure mode and the failure states stored in the status buffer.

13. The apparatus of claim 12, wherein the control table for each failure mode is a table which is configured to store which of the main brake controller, the redundancy brake controller, the electronic parking brake controller, and the regenerative brake controller is configured to brake the vehicle according to a combination of the failure state of the main brake controller, the failure state of the redundancy brake controller, and the failure states of the main brake controller, the redundancy brake controller, and the electronic parking brake controller.

14. The apparatus of claim 10, wherein the main brake pedal sensor, the redundancy brake pedal sensor, the main brake controller, the redundancy brake controller, and the electronic parking brake controller are in a failure state when:
    power supplied to each of the main brake pedal sensor, the redundancy brake pedal sensor, the main brake controller, the redundancy brake controller, and the electronic parking brake controller is abnormal;
    signals output from the main brake pedal sensor and the redundancy brake pedal sensor during an initial startup are abnormal; and
    signals output from the main brake controller, the redundancy brake controller, and the electronic parking brake controller are abnormal as a preset test signal is applied during the initial startup.

15. The apparatus of claim 9, wherein, when the first output signal and the second output signal have different values, the main brake controller is configured to control the brake according to a first braking signal based on the first output signal to brake the vehicle.

16. The apparatus of claim 9, wherein the brake is a Brake-By-Wire (BBW) and includes at least one of an Electro-Hydraulic Brake (EHB), an Electro-Mechanical Brake (EMB), and a hybrid EMB.

* * * * *